United States Patent [19]

Taylor

[11] Patent Number: 5,142,585
[45] Date of Patent: Aug. 25, 1992

[54] SPEECH PROCESSING APPARATUS AND METHODS

[75] Inventor: Michael R. Taylor, Swindon, England

[73] Assignee: Smiths Industries Public Limited Company, London, England

[21] Appl. No.: 812,832

[22] Filed: Dec. 20, 1991

Related U.S. Application Data

[63] Continuation of Ser. No. 358,050, May 30, 1989, abandoned, which is a continuation-in-part of Ser. No. 11,088, Feb. 5, 1987, abandoned.

[30] Foreign Application Priority Data

Feb. 15, 1986 [GB] United Kingdom ............... 8603756

[51] Int. Cl.⁵ .............................................. G10L 7/08
[52] U.S. Cl. .................................... 381/47; 381/46; 381/94
[58] Field of Search .......................... 381/41–43, 381/46, 47, 71, 94; 395/2

[56] References Cited

U.S. PATENT DOCUMENTS

| | | | |
|---|---|---|---|
| 4,239,936 | 12/1980 | Sakoe | 381/43 |
| 4,417,098 | 11/1983 | Chaplin et al. | 381/94 |
| 4,624,010 | 11/1986 | Takebayashi | 381/43 |
| 4,625,083 | 11/1986 | Poikela | 381/46 |
| 4,720,802 | 1/1988 | Damoulakis et al. | 364/513.5 |
| 4,937,871 | 6/1990 | Hattori | 381/46 |

OTHER PUBLICATIONS

North et al., IEEE 1985 National Aerospace and Electronics Conference NAECON 1985, "Dynamic Retraining Approaches for an Airborne Speech Recogniton System", May 20–24, 1985, pp. 970–974.

Holmes et al., IEEE ICASSP 86, "Noise Compensation for Speech Recognition Using Probabilistic Models", Apr. 7–11, 1986, pp. 741–744.

Primary Examiner—Dale M. Shaw
Assistant Examiner—David D. Knepper
Attorney, Agent, or Firm—Pollock, Vande Sande & Priddy

[57] ABSTRACT

Speech processing apparatus has a store containing a reference vocabulary of words and carries out active word selection in accordance with mode data supplied to the apparatus. After this, the apparatus performs dynamic template adaptation in dependence on the output of a sensor that monitors environmental influences on the speaker of the kind that modify speech sounds made by the speaker. The sensor may be responsive to vibration or acceleration forces on the speaker, the apparatus using information about how vowel and consonant groupings are influenced by forces on the speaker to perform the template adaptation. Pattern matching is used to compare the speech sounds of the speaker with the modified signals after template adaptation to identify the most likely word spoken.

6 Claims, 3 Drawing Sheets

SPEECH PROCESSING APPARATUS AND METHODS

This application is a, continuation of Ser. No. 07/358,050, filed on May 30, 1989, which application is a continuation-in-part of Ser. No. 07/011,088 filed Feb. 5, 1987, both abandoned.

BACKGROUND OF THE INVENTION

This invention relates to speech processing apparatus and methods.

In complex equipment having multiple functions it can be useful to be able to control the equipment by spoken commands. This is also useful where the user's hands are occupied with other tasks or where the user is disabled and is unable to use his hands to operate conventional mechanical switches and controls.

The problem with equipment controlled by speech is that speech recognition can be unreliable, especially where the voice of the speaker is altered by environmental factors, such as vibration. This can lead to failure to operate or, worse still, to incorrect operation.

Speech signal processing can also be used in communication systems, to improve the quality of speech and reduce noise. Where, however, the speech is severely degraded, such as by vibration or by a high 'g' loading, the processing equipment may not recognise the input as being a speech signal and may therefore remove vital components of the speech signal by filtering. The processing equipment can, therefore, in some circumstances lead to a reduction in the speech information.

BRIEF SUMMARY OF THE INVENTION

It is an object of the present invention to provide improved speech processing apparatus and methods.

According to one aspect of the present invention there is provided speech processing apparatus including microphone means arranged to sense speech sounds made by a speaker and derive a first output signal in accordance therewith, the apparatus including sensor means arranged to monitor environmental influences on the speaker of the kind that modify the speech sounds made by the speaker, and processing means arranged to receive the output from the microphone means and from the sensor means, the processing means being arranged to produce a second output signal in accordance with the speech sounds made by the speaker that is compensated at least in part for the environmental influences.

The sensor means may be responsive to vibration or acceleration forces on the speaker. Alternatively, the sensor means may be responsive to the level of audible noise heard by the speaker.

The speech processing apparatus preferably includes storage means containing information of a reference vocabulary of words, the storage means being arranged to derive a signal by modifying the information in accordance with the output of the sensor means, and the apparatus including comparator means that is arranged to compare the first output signal with the signal derived by the storage means.

The apparatus may be arranged to perform dynamic template adaptation the reference vocabulary in accordance with the output of the sensor means. The processing means may contain information about how vowel and consonant groupings are influenced by forces on the speaker, the processing means using this information in producing the second output signal. The comparator may be arranged to perform comparison by pattern matching techniques. The storage means may be arranged to carry out active word selection from a vocabulary in accordance with mode data. The storage means may be arranged to perform sub-set selection from the vocabulary in accordance with words previously spoken and recognised. The apparatus may include feedback means arranged to provide information to the speaker.

According to another aspect of the present invention, there is provided a method of providing speech processing comprising the steps of deriving speech signals from a speaker's speech sounds, deriving environmental signals in accordance with environmental influences on the speaker affecting the nature of the speech sounds, deriving signals from a reference vocabulary of words, modifying the signals derived from the reference vocabulary in accordance with the environmental signals, and comparing the speech signals with the modified signals.

According to a further aspect of the present invention there is provided apparatus for performing a method according to the said other aspect of the present invention.

A speech recognition system in accordance with the present invention, will now be described, by way of example, with reference to the accompanying drawings.

DETAILED DESCRIPTION

Figure 1:
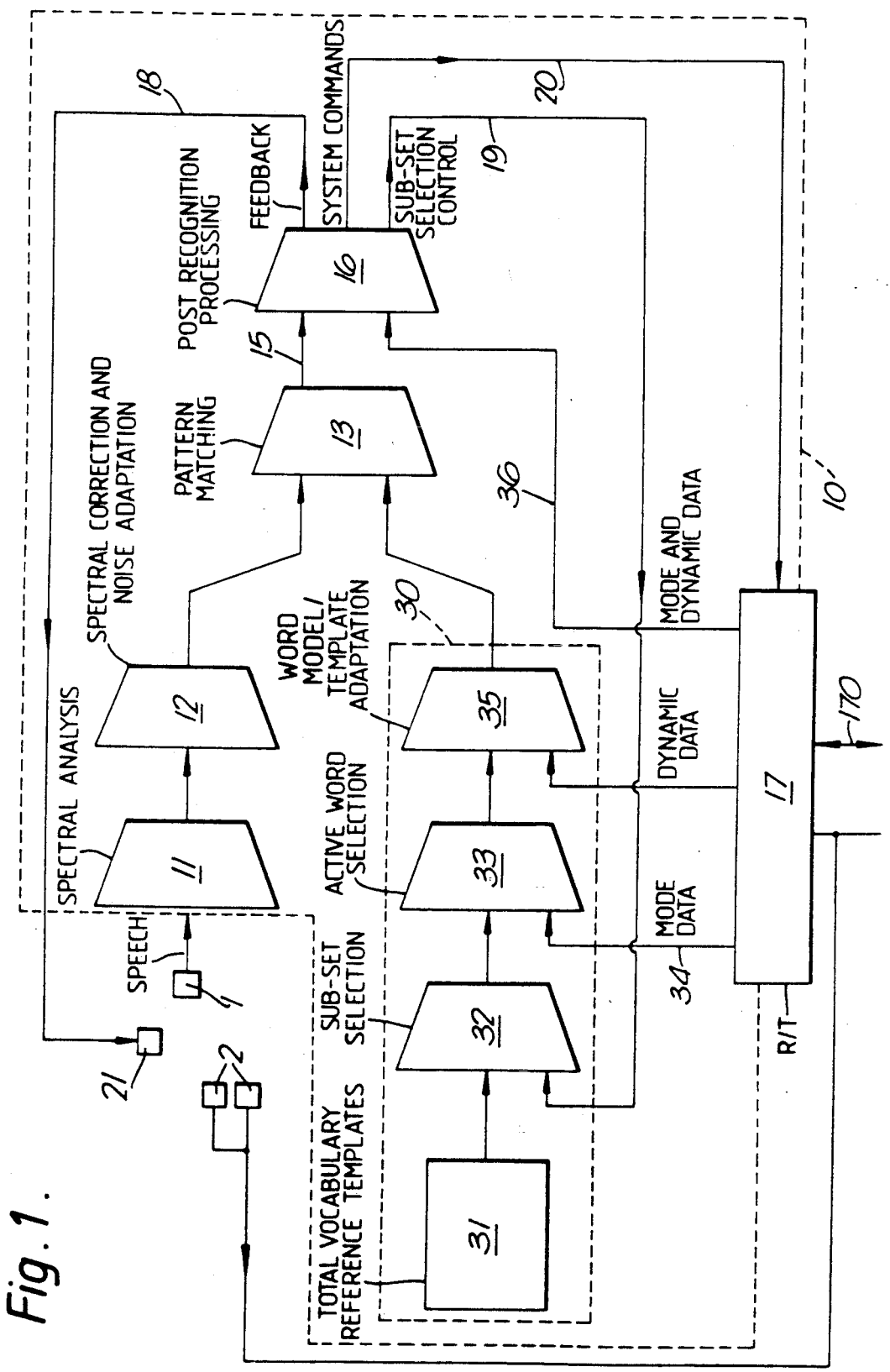
FIG. 1 shows the system schematically.

With reference first to FIG. 1, the speech recognition system includes a processing unit 10 that receives input signals from a microphone 1 and contextual inputs from environmental sensors 2 and a databus 170. The microphone 1 is located close to the speaker's mouth so as to detect his speech sounds, whilst the sensors 2 are located where they will respond to the same environmental influences to which the speaker is subjected. The sensors 2 may be different for different applications, but typically they will be responsive to vibration, which can cause frequency modulation of speech sounds, and to acceleration, which can cause severe timing problems for the speech articulators. Alternatively, the sensors 2 may include an audible noise detector that provides an output indicative of environmental audible noise heard by the user and, in this respect, the noise detector would be located in the region of the user's ears. High noise levels have been found to alter speech and the present apparatus can be used to compensate for this.

The signal from the microphone 1 is first supplied to a spectral analysis unit 11 which produces output signals in accordance with the frequency bands within which the sound falls. These signals are supplied to an optional spectral correction and noise adaptation unit 12 which improves the signal-to-noise ratio or eliminates, or marks, those signals that can only have arisen from noise rather than speech. Output signals from the unit 12 are supplied to one input of a comparator or pattern matching unit 13. The other input to the pattern matching unit 13 is taken from an active vocabulary storage 30 which is described in greater detail below. The pattern matching unit 13 compares the frequency/time patterns derived from the microphone 1 with the stored vocabulary and produces an output on line 15 in accordance with the word which is the best fit or has the highest probability of being the sound received by the microphone 1.

The output on line 15 is supplied to one input of a post recognition processing unit 16, the other input receiving mode and dynamic data from a remote terminal 17. The unit 16 performs various tasks on the string of word outputs from the pattern matching unit 13 as discussed in greater detail later. The post recognition processing unit 16 has three outputs. One output is provided on line 18 as a feedback channel to an indicator 21. This may be an audible or visual indicator perceivable by the speaker which either confirms his spoken commands, as recognised by the units 13 and 16, or requests repetition of all or part of the command, where an unsatisfactory recognition is achieved. The second output is provided on line 19 to a word sub-set selection unit 32 forming a part of the vocabulary store 30, the operation of which is described in detail below. The third output is provided on line 20 as the system command signal to the remote terminal 17. The system command signal is produced when the unit 10 identifies a spoken command with sufficient probability and may, for example, be used to effect operation of external equipment via the databus 170.

The operation of the vocabulary storage 30 will now be described in greater detail. The store 30 includes a reference vocabulary 31 in the form of pattern templates or word models of the frequency/time pattern or state descriptions of different words. This vocabulary is established by the speaker speaking a list of words, the sounds made being entered in the vocabulary 31 and labelled with the associated word. The total vocabulary 31 may be further reduced by an optional sub-set selection at 32 under control of signals on line 19 in accordance with words previously spoken and recognised.

Following sub-set selection, the vocabulary is further subjected to active word selection at 33 in response to mode data on line 34 from the remote terminal 17 which is derived from information supplied to the remote terminal on the databus 170. For example, in an aircraft, the mode data may indicate whether the aircraft is landing or taking off, or is in mid flight. Alternatively, for example, if a radio channel had already been selected via a spoken command, the probability of reselection will be small so the words associated with selection of that radio channel can be excluded from the vocabulary at 33. Poor correlation with selected, active templates could be used to invoke re-processing of the speech on a wider syntax.

Figure 2A:
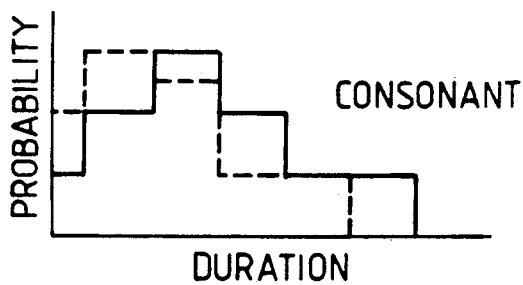
FIGS. 2A to 2D illustrate probability functions for different sounds.
Figure 2B:
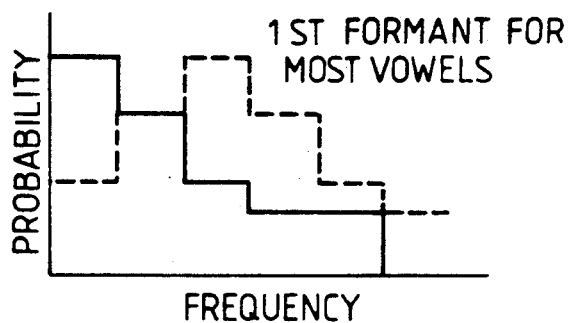
Figure 2C:
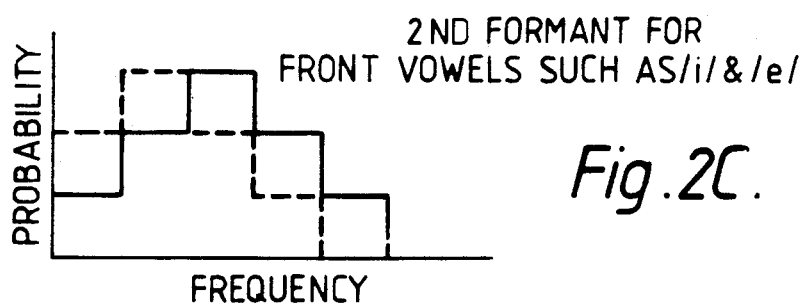
Figure 2D:
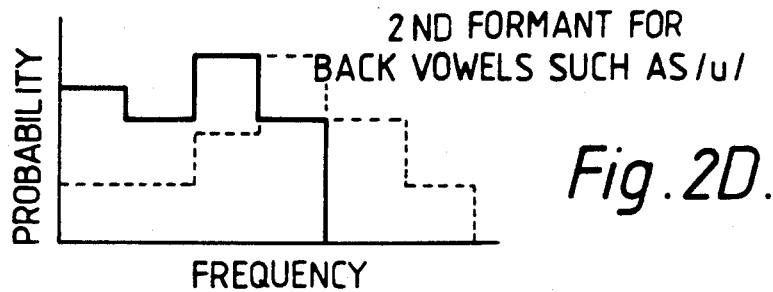

After active selection at 33, the vocabulary is subjected to template adaptation at 35. The function performed at 35 is a dynamic adaptation of the active word templates by anticipating the behaviour of the human speech production mechanism during unusual environmental conditions as detected by the sensors 2. Knowledge about how speech components such as vowel/Consonant/vowel, vowel/consonant, consonant/vowel or consonant/vowel/consonant groupings are influenced by forces on the speaker are also taken into account. More particularly, the reference speech patterns are stochastic models in the form of, for example, Hidden Markov Models of the kind well reported in speech recognition applications where states can be used either implicitly or explicitly to describe the acoustic-phonetic structure of each word in terms of the probability of any test vector or frame from an unknown input belonging to a particular state of the reference model. FIG. 2A shows an example of a probability density function in terms of the temporal duration of a consonant. FIGS. 2B to 2D show similar probability density functions in terms of frequency (or some other spectral measure) for the first formant of most vowels (FIG. 2B), for the second formant of front vowels such as /i/ and /e/ (FIG. 2C) and for the second formant of the back vowel /u/ (FIG. 2D). For speech not influenced by environmental factors, these probability density functions are represented by the solid lines in FIGS. 2A to 2D. It is known that the probability density functions are influenced by acceleration forces on the speaker in the following ways. For a consonant, the probability increases that it will have a duration which decreases with increasing acceleration, as shown by the broken line in FIG. 2A. For the first formant of most vowels, the probability increases that it will have a higher frequency with increasing acceleration, as shown by the broken line in FIG. 2B. For the second formant of front vowels, the probability increases that the formant frequency will be lower with increasing acceleration as shown by the broken line in FIG. 2C. For the second formant of a back vowel, the probability is increased that the formant will be higher with increasing acceleration as shown by the broken line in FIG. 2D. The extent of modification of these probability density functions is dependent on the level and direction of acceleration. Other environmental influences on the speaker such as vibration, noise level or stress have analogous effects on these probability density functions.

Figure 3:
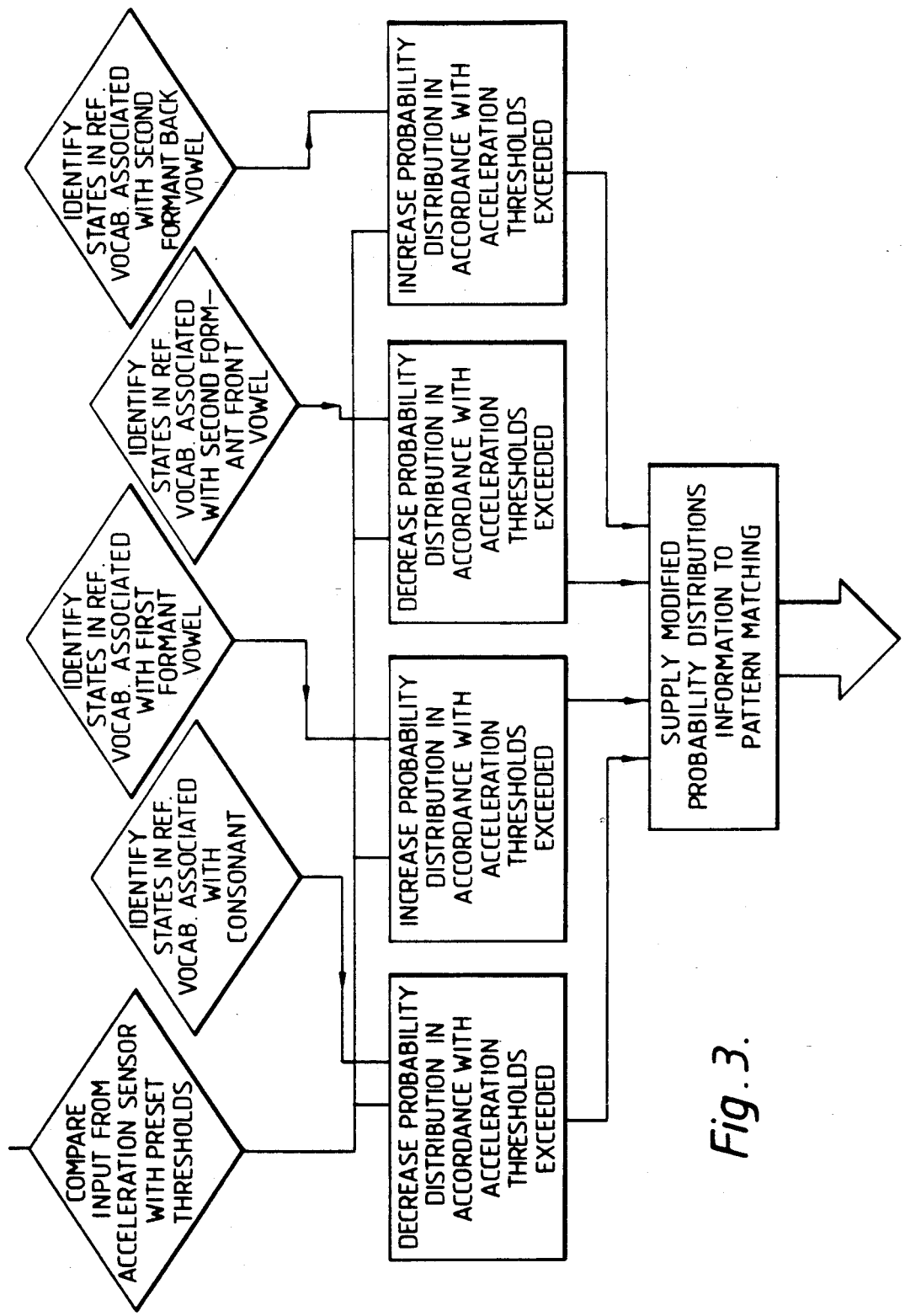
FIG. 3 is a flowchart showing operation of the system.

With this knowledge of the way in which the speech signal is modified, the apparatus modifies the probability density functions of the stored reference vocabulary templates or models in the manner illustrated in the flow chart in FIG. 3. FIG. 3, for simplicity, illustrates only the way in which acceleration influences dynamic adaptation of the templates. In some circumstances, acceleration may be the only factor measured and used for this dynamic adaptation. Where other environmental factors are used, it will be appreciated that these can be employed in a similar manner. Briefly, FIG. 3 shows that the states in the reference vocabulary representing the consonants and different vowel classes are identified and labelled and that the probability density functions of these are increased or decreased appropriately by an amount dependent on the level of acceleration detected. These modified probability density functions, which now bear a closer resemblance to the speech produced by the speaker under high g-forces are then supplied to the pattern matching unit 13.

As mentioned previously, mode data and dynamic environmental data are also supplied to the post recognition processing unit 16, via line 36. The tasks performed by the unit 16 are as follows:

1. Grammar parsing and word spotting techniques are used to detect errors and recover words that have not been identified;

2. Identification of the template string of words which best fits the contextual information at that time. Since particular strings of words are more likely than others to be spoken during particular environmental circumstances, this can be used to improve the identification of the particular command spoken by the user; and 3. Following the final identification, the processing unit 16 may generate signals for use in bringing up to date the vocabulary sub-set selection performed by 32. These signals are supplied to the vocabulary storage 30 via line 19.

Although the above system has been described for producing command signals, such as for controlling equipment, a similar system may be used in a speech communication system. In such an alternative arrangement, the line 20, instead of carrying command signals would carry speech signals in respect of the identified words and phrases.

What I claim is:

1. Speech processing apparatus comprising:
   first means for deriving a first signal in accordance with the utterances made by a speaker,
   second means responsive to the physical forces, including at least one of the forces of physical vibration and acceleration acting on the speaker, which have the effect of altering the characteristics of the voice sounds uttered by the speaker;
   storage means containing a reference vocabulary in the form of patterned templates of words; and
   a processing unit receiving the output from the first means and from the second means and performing dynamic adaptation on said templates in accordance with the output of said second means to thereby modify said templates to anticipate the behavior of the speaker's speech production mechanism as affected by the physical forces detected by said second means;
   said processing unit comparing the first output signal with the modified templates to produce a second output signal in accordance with the speech sounds uttered by the speaker which are thus compensated, at least in part, by the physical forces acting on the speaker.

2. Speech processing apparatus according to claim 1, wherein said processing unit contains information about how vowel and consonant groupings are influenced by forces on the speaker said processing unit in response to said information modifies said templates.

3. Speech processing apparatus according to claim 2, wherein said processing unit compares the first output signal with the modified templates by pattern matching techniques.

4. Speech processing apparatus according to claim 1, wherein said apparatus includes means supplying mode data to said storage means, and wherein said storage means includes means for carrying out active word selection from said reference vocabulary in accordance with said mode data.

5. Speech processing apparatus according to claim 1, wherein said apparatus includes feedback indicator means for providing information to the speaker.

6. A method of providing speech processing comprising the steps of:
   deriving first signals from speech sounds uttered by a speaker;
   deriving second signals having a manifestation representative of at least one of the environmental physical forces corresponding respectively to the acceleration and vibration forces acting on the speaker of the kind which tend to affect the nature of the speech utterances made by the speaker;
   performing dynamic adaptation on stored pattern templates of words in a vocabulary store in accordance with said force signals to modify the templates to anticipate the behavior of the speaker's speech production mechanism during the force; and comparing the said speech signals with the modified templates to provide thereby an indication of the similarity between speech sounds and stored words that is compensated at least in part for the forces.

* * * * *